(12) United States Patent
Hege

(10) Patent No.: US 9,332,734 B1
(45) Date of Patent: May 10, 2016

(54) PET CALMING HARNESS AND COAT

(71) Applicant: Paula Padgett Hege, Rocky Mount, VA (US)

(72) Inventor: Paula Padgett Hege, Rocky Mount, VA (US)

( * ) Notice: Subject to any disclaimer, the term of this patent is extended or adjusted under 35 U.S.C. 154(b) by 187 days.

(21) Appl. No.: 14/170,766

(22) Filed: Feb. 3, 2014

Related U.S. Application Data

(60) Provisional application No. 61/761,313, filed on Feb. 6, 2013.

(51) Int. Cl.
*A01K 27/00* (2006.01)

(52) U.S. Cl.
CPC .................... *A01K 27/002* (2013.01)

(58) Field of Classification Search
CPC ..... A22C 27/00; A22C 27/001; A22C 27/002
USPC .......... 452/769–771, 795, 798, 850, 863, 907
See application file for complete search history.

(56) References Cited

U.S. PATENT DOCUMENTS

| | | | | |
|---|---|---|---|---|
| 5,329,885 A * | 7/1994 | Sporn | ................... | A01K 27/002 119/792 |
| 5,611,298 A * | 3/1997 | Sporn | ................... | A01K 27/002 119/792 |
| 5,915,335 A * | 6/1999 | Holt, Jr. | ............... | A01K 1/0263 119/770 |
| 6,314,915 B1 * | 11/2001 | Pope | .................... | A01K 27/002 119/712 |
| 6,820,574 B2 * | 11/2004 | Sharpe | ................. | A01K 13/006 119/820 |
| 7,121,231 B2 | 10/2006 | Benefiel | | |
| 7,441,516 B2 | 10/2008 | Sharpe | | |
| 7,657,099 B2 * | 2/2010 | Park | .................... | G06K 9/00664 382/205 |
| 8,210,131 B2 * | 7/2012 | Friedland | ............. | A01K 13/006 119/792 |
| 8,291,867 B2 * | 10/2012 | Blizzard | .............. | A01K 13/006 119/850 |
| 2004/0025804 A1 * | 2/2004 | Smith | ................... | A01K 1/0263 119/792 |
| 2006/0090711 A1 * | 5/2006 | Richards | .............. | A01K 13/006 119/850 |
| 2008/0047501 A1 * | 2/2008 | Madere | ................ | A01K 27/002 119/863 |
| 2008/0067163 A1 | 3/2008 | Axinte et al. | | |
| 2008/0223310 A1 * | 9/2008 | Remick | ................ | A01K 27/002 119/792 |
| 2012/0024239 A1 | 2/2012 | Forbes | | |
| 2014/0311423 A1 * | 10/2014 | Roney, III | ............ | A01K 27/002 119/792 |

FOREIGN PATENT DOCUMENTS

WO    WO 2006/053233    5/2006

* cited by examiner

*Primary Examiner* — Richard Price, Jr.

(74) *Attorney, Agent, or Firm* — Charles S. Sara, Esq.; DeWitt Ross & Stevens SC

(57) ABSTRACT

A pet calming harness is designed to ease and alleviate an animal's fear and tension due to fright inducing and excitable activities such as thunder, lightning, etc. The therapeutic harness includes a combination neck collar and body strap which converge at an X-strap location above the scruff or nape of the animal's neck to provide gentle, but not binding, pressure on the animal in order to calm the animal.

20 Claims, 6 Drawing Sheets

PET CALMING HARNESS AND COAT

CROSS-REFERENCE TO RELATED APPLICATION

The application claims priority to U.S. Provisional Application entitled "Pet Calming Harness and Coat," Ser. No. 61/761,313, filed Feb. 6, 2013, which is incorporated herein by reference in its entirety.

FIELD OF THE INVENTION

The present invention is directed to a pet harness and coat attachment. Specifically, the present invention is directed to a pet harness which serves to calm the animal, specifically a dog, during periods of excitement. The harness can include a coat attachment.

BACKGROUND

Pet harnesses and coats, specifically for dogs, are well known in the industry for restraining animals and providing protection against elements, such as rain, cold and snow. The harnesses are primarily meant to restrain a pet, typically by use of a leash, and are often used in place of a dog collar. Harnesses are placed on the pet such that the leash can be attached at an area between and behind the shoulder blades of the dog. An animal coat with an integrated harness can also be provided. See for example U.S. patent publication 2008/0223310 to Remick et al. and U.S. patent publication 2006/0090711 to Richards. These devices are primarily meant to protect animals from the elements and to restrain the animals, and are not intended to assist an animal which may be suffering from anxiety, fear or excitement.

There are some coats and harnesses for animals, which are allegedly designed to help an animal overcome anxiety or fear. Reference is made to U.S. Pat. No. 6,820,574 to Sharpe which is directed to an animal garment which applies pressure to various acupressure points to control the behavior of the animal. The garment includes a number of constrictor bands for application to various areas on the animal. One band is situated around the animal's neck and may be adjusted by a string or cord to apply the "proper" amount of constriction. According to the inventors, this treatment is designed to help reduce stress. U.S. Pat. No. 8,291,867 to Blizzard is directed to a garment to assist in reducing an animal's anxiety. The garment includes constricting elements which are fastened around a dog's chest and stomach and tightened as necessary to apply pressure to reduce anxiety in the dog. Straps may be provided to secure the garment to the dog's neck. Thus, the relief from anxiety is accomplished by applying pressure on the dog's girth, sternum or vertebrae.

While various devices exist ostensibly for restraint, protection and stress relief for animals, there is a need to provide an animal harness which accomplishes similar results without the necessity of constricting the animal or applying constant pressure to the animal's girth, spine or neck which can be uncomfortable to the animal and, in fact, generate some stress.

SUMMARY OF THE INVENTION

For purposes of this disclosure, the inventive concept of the present invention will be referred to as an "animal calming harness," "pet calming harness," or simply a "harness." The present invention is directed to an animal calming harness for an animal comprising a neck collar having a first end and a second end, a girth strap having a first end and a second end, wherein the first end of the girth strap is connected to the first end of the neck collar and wherein the girth strap is adapted to pass along the animal's chest. In addition, the animal calming harness includes a girth strap having a first end and a second end, wherein the second end of the girth strap is connected to the second end of the neck collar forming a cross-strap location on the scruff of the animal's neck, and the second end of the girth strap is connected to the first end of the girth strap.

The present invention is further directed to a combination calming harness and coat for an animal, comprising a harness as described above in combination with a coat which includes a first neck portion, wherein the neck portion includes a releasably locking neck piece, a second rear portion, and an alternating side portion.

Thus, the present invention can provide a three-in-one product including (1) an animal calming harness that calms and reduces the anxiety of scared, oversensitive, frightened, alarmed and aggressive pets, (2) an animal restraining harness, and (3) an optional animal coat. The harness of the present invention is also a training aide to help an animal to focus while learning and to give an animal confidence.

The harness was initially devised as a therapeutic calming device for frightened animals, specifically dogs, which become violently afraid of thunderstorms and lightening. It also calms animals that have a fear of riding in cars, fear of loud sounds such as guns, sirens and fireworks, household alarm systems, strangers, separation anxiety, new places and provide stress relief and decompression for working dogs such as drug and bomb detectors and medical service animals.

The harness is effective in calming overexcited and anxious animals of all sizes, from very small "toy" breeds and other small animals (beginning at around 5 pounds) through and including the large, giant breeds of dogs (up to 200 pounds). It is of course within the scope of the present invention to provide harness sizes suitable for fitting animals larger than 200 pounds, such as, for example, horses.

The harness is anatomically designed to promote calm and submission in an animal. When the animal wears the harness for training, the structure of the harness calms the animal allowing it to become more focused and less distracted. Obedience becomes gratifying, and the gentle pressure that the harness places on the animal triggers an innate response of calm and trust in the handler. In the animal's mind, the handler, who puts the harness on the animal, then becomes associated with the good, secure and loving feeling that the harness gives the animal. The harness helps shy animals gain confidence and develop a positive self image. It promotes a well-adjusted, happy animal.

The harness also helps the owner in establishing trust and control over an anxious animal. With each use, the animal becomes more at ease simply with the sight of the harness and the process of gearing up, or putting on, the harness. As the animal receives the positive reinforcement, i.e., the therapeutic calming effect from wearing the harness, a calmed, conditioned response to the harness is formed. Thus, with each use of the harness of the present invention, dogs exhibit shorter time frames in attaining the "calmed effect." Though calming begins almost immediately upon wearing the harness, maximum calming may not occur the first time for several minutes. After the third or fourth successful use of the harness, animals typically reach maximum calming in a matter of seconds and typically sit, lie down at rest and/or go to sleep even in the most stressful situations. The harness works by distributing a slight, but constant degree of pressure on the upper aspect of the animal's neck, also known as the scruff of the animal's neck.

The harness is capable of being used with a leash, eliminating the need for a collar. In combination with a coat, the harness provides protection from the elements, including sun, rain and snow by covering over 90% of the dog's body.

Because of its sleek silhouette and the enhanced durability, the harness can be worn for extended periods of time, even days at a time.

The objects and advantages of the invention will appear more fully from the following detailed description of the preferred embodiment of the invention made in conjunction with the accompanying drawings.

DETAILED DESCRIPTION OF THE INVENTION

The harness of the present invention can be used with a variety of animals, such as dogs, cats, other house pets, monkeys, pigs, horses, cattle, goats, sheep and other farm animals. While the present invention will be specifically described in relationship to dogs, it is acknowledged that the harness of the present invention can be applied to other animals.

Figure 1:
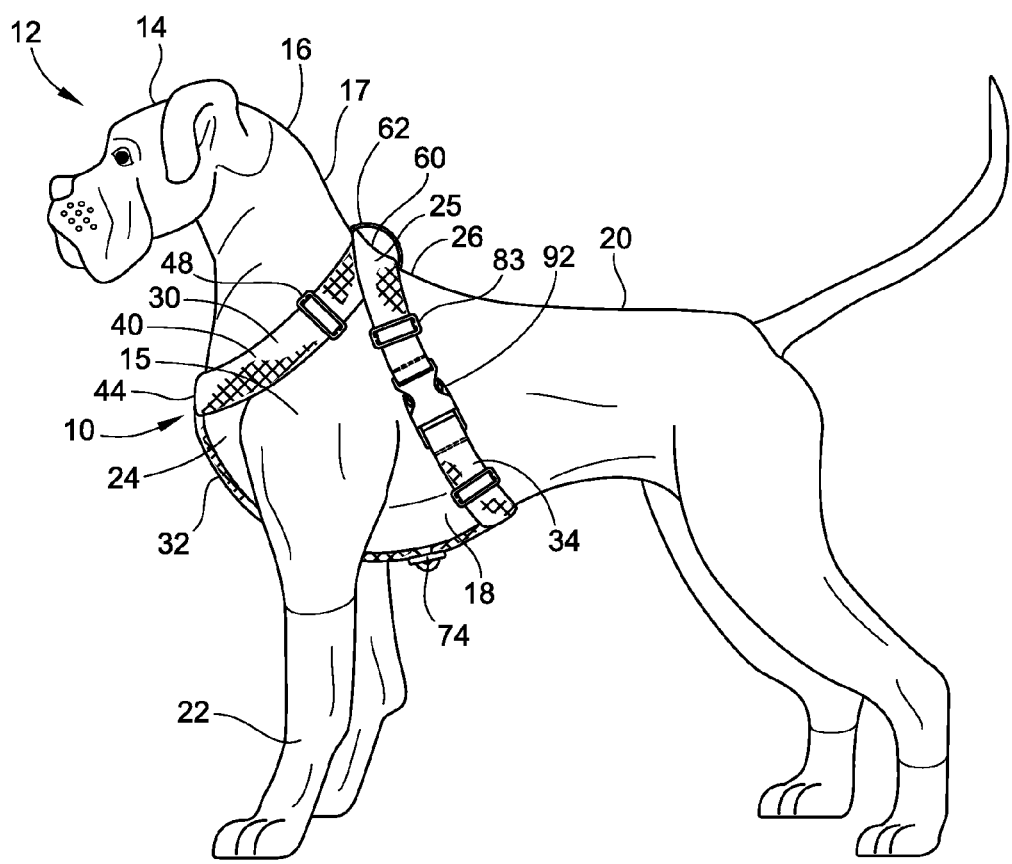
FIG. 1 is a side elevated view illustrating a dog wearing the harness of the present invention.

Referring now to FIG. 1, there is illustrated a side view of the harness 10 of the present invention placed on an animal 12, illustrated here as a dog, having a head 14, shoulders 15, back of skull 16, neck 17, chest 18, back 20, front legs 22, sternum 24 and the scruff 25, characterized as an area generally having loose skin, between the base of the neck 17 and the withers 26 on the back 20 of the dog 12.

Figure 2:
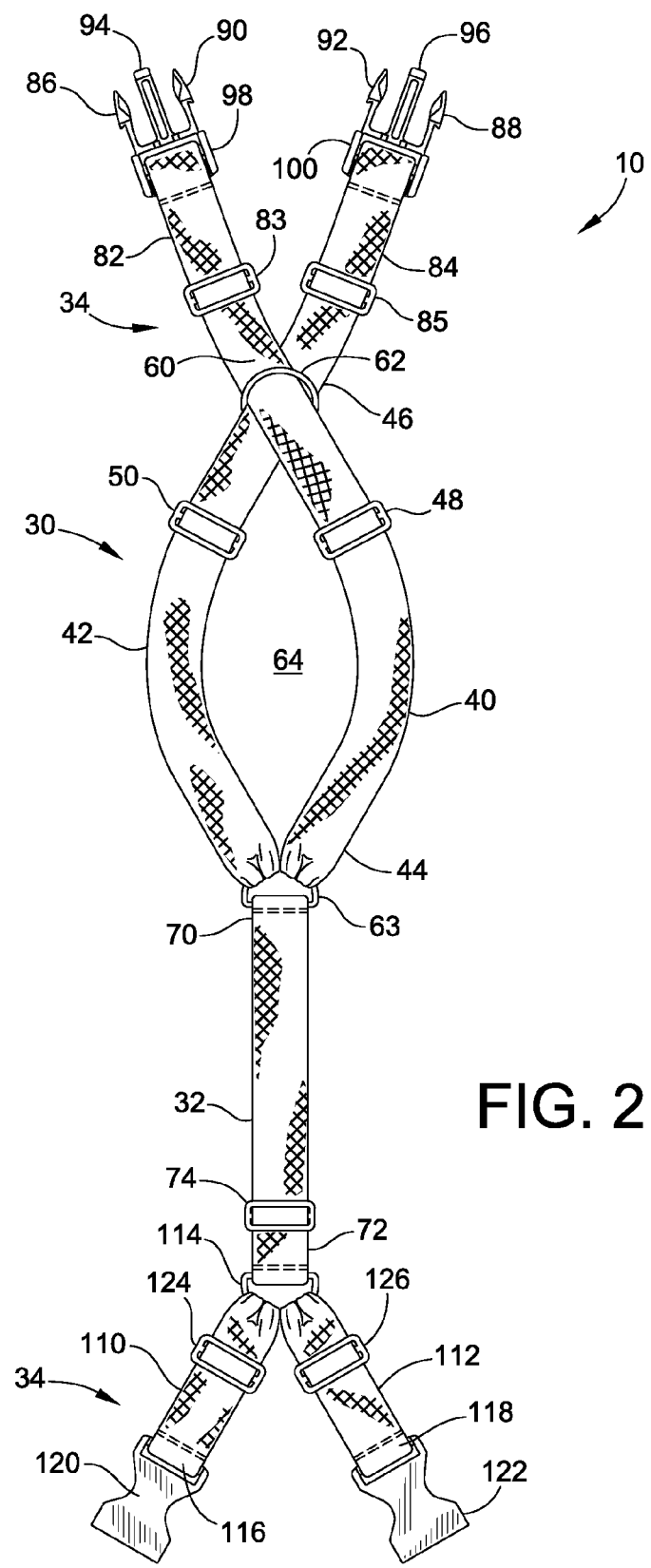
FIG. 2 is a top elevated view of the harness of the present invention.
Figure 3:
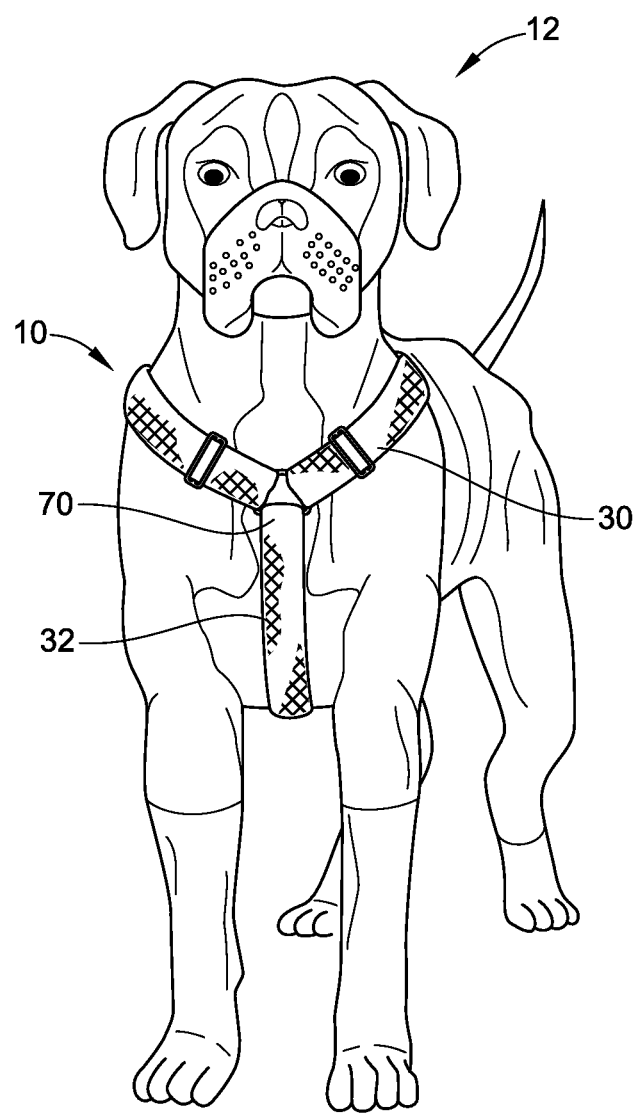
FIG. 3 is a front elevated view illustrating a dog wearing the harness of the present invention.
Figure 4:
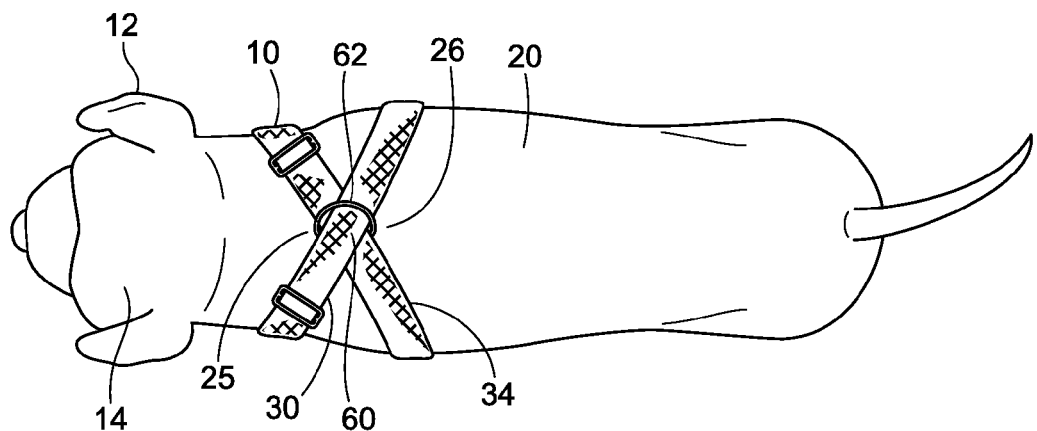
FIG. 4 is a top elevated view illustrating a dog wearing the harness of the present invention.

Referring now to FIG. 2, the harness 10 is divided into three main component parts, namely the neck collar 30, the tie strap 32 and the girth straps 34. The neck collar 30 includes a first neck strap 40 and a similar second neck strap 42 attached at the first end 44 of the neck collar 30 and the second end 46 of the neck collar 30 in order to form an encircling collar for placing around the neck 17 of the dog 12, as illustrated in FIGS. 1 and 4. It is within the scope of the present invention to provide adjusters 48, 50 to lengthen the straps 40 and 42 of the neck collar 30 as desired.

As illustrated in FIG. 2, the first neck strap 40 and second neck strap 42 overlap at the second end 46 to form a cross strap location, or cross strap 60. The neck straps 40 and 42 are preferably adhered together at the cross strap 60 by stitching, clamps, hook and loop fasteners or other means to maintain the cross strap appearance. Preferably, a connecting ring 62, such as a D-ring or the like known to the art, can be fit directly at the cross strap 60 location for use in restraining the dog or attaching a leash (not illustrated) thereto.

Located at the first end 44 of the neck collar 30 is a connecting ring 63, such as a D-ring or the like, for attaching the first neck strap 40 and the second neck strap 42 at the first end 44 of the neck collar 30. In this manner, the neck collar 30 provides a closed collar-like opening 64 for placement over the head 14 of the dog 12.

Also connected to connecting ring 62 (FIG. 2) is a tie strap 32 having a first end 70, and a second end 72. If desired, an adjuster 74 may be attached to adjust the length of the tie strap 32 in a manner known to the art.

The girth straps 34 include a first or upper set of girth straps 82, 84 which are extensions of the first and second neck straps 40, 42, respectively. Upper girth straps 82, 84 are connected at the cross-strap 60 location. The proximal ends 86, 88 of the upper girth straps 82, 84 are defined by quick release buckles 90, 92. In addition, adjusters 83 and 85 may be included on the girth straps 82, 84 to adjust the lengths of the strap. As illustrated in FIG. 2, the upper girth straps 82, 84 are defined by the male ends 94, 96 of standard quick release buckles 90, 92. It is within the scope of the present invention to provide a second set of adjusters 98, 100 to adjust the length of the upper girth straps 82, 84.

Referring to FIG. 2, there is illustrated lower girth straps 110, 112 attached to a connecting ring 114, which acts to connect the second end 72 of the tie strap 32 to the lower girth straps 110, 112. The proximal ends 116, 118 of the lower girth straps 110, 112 are defined by the female end 120, 122 of the quick release buckles 90, 92. Adjusters 124, 126 may be included on the lower girth straps 110, 112 to adjust the length of the lower girth straps.

FIG. 1 illustrates the harness 10 of the present invention wherein the buckles 90, 92 are connected thereby connecting the first upper girth trap 84 with the second lower girth strap 112 and the first upper girth strap 82 with the second lower girth strap 110 thereby creating an opening 130 for receiving the chest 18 and the head 14 and neck 17 of the dog 12 as illustrated in FIGS. 1 and 4-6.

Figure 5:
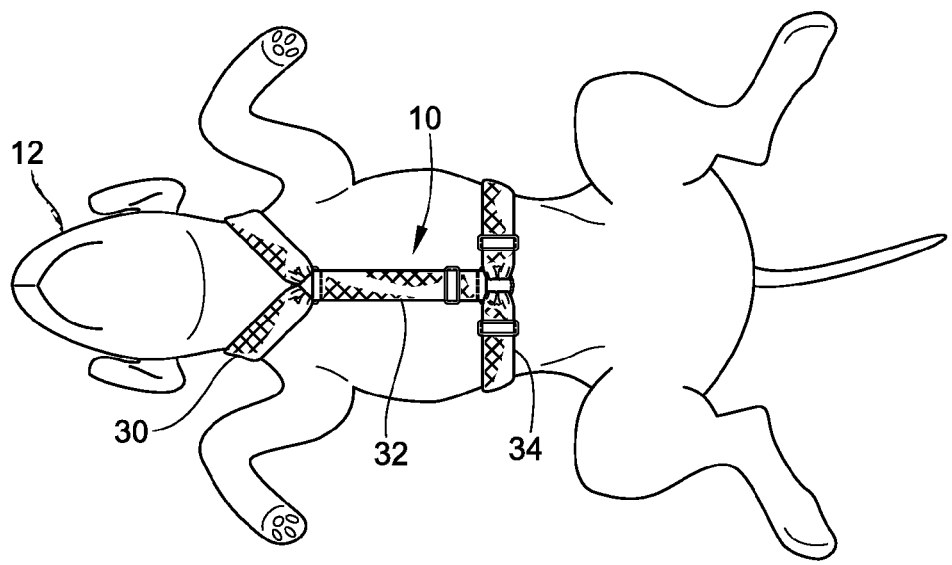
FIG. 5 is a bottom elevated view illustrating a dog wearing the harness of the present invention.

Referring to FIGS. 1 and 4-5, the neck collar 30 of the harness 10 is placed over the head 14 of the dog 12 such that the cross strap location 60 at the second end 46 of the neck collar 30 rests directly on the scruff 25 of the animal's back 20. The first end 44 of the neck collar 30 is aligned at the dog's breastbone 24 as illustrated in FIG. 1. Preferably, the cross-strap 60 is fixed on the scruff 25 such that the neck straps 40, 42 of the neck collar 30 are positioned at an approximate 30° angle to the breastbone 24 which is generally situated perpendicular to the ground. The angle of the neck straps 40, 42 resting on the scruff 25 of the dog 12 allows a very light, gentle pressure on the dog 12 and is not intended to fit the dog's neck 17 tightly. The entire harness 10 should fit loosely in the shoulder 15, neck 17 and chest 18 areas to ensure that the dog 12 is not pinched, choked, frightened or traumatized by undo pressure being placed in this sensitive area.

As described above, the harness 10 is not intended to add undue pressure on the dog's chest 18 or back 20, but rather to keep the cross strap 60 in place on the scruff 25 of the dog's back 20. The positioning of the neck collar 30 at an approximate 30° angle, as described above, helps the cross-strap 60 to move in a side-to-side motion as the dog 12 moves. The girth strap 34 keeps the placement of the cross-strap 60 in rhythm with the dog's gait. In contrast, other harnesses are immobile and the harness rubs against the dog's body instead of moving with the dog's body.

The system of the harness 10 of the present invention places a gentle and constant pressure on the scruff 25 of the dog's neck 17. This pressure point mimics the same pressure that a mother dog uses to lift and move her puppies. Mother dogs instinctively, and commonly, use this method to transport their puppies to safety and to teach the pup's subordination. This practice is so comforting to newborn pups that many times the pup's bodies actually go limp, an indication that the pups have so much trust in the mother dog that they are reassured and completely calmed by the experience. Because the harness 10 mimics the action of the mother dog, it aids in achieving an even stronger bond and relationship with the dog. The dog will gain more confidence in itself and in the handler with each use of the harness 10.

As illustrated in FIGS. 1 and 5, the tie strap 32 extends from the connecting ring 63 of the neck collar 30 between the dogs front legs 22 and meets the girth straps 34. The girth straps 34 are adjustable in length by means of the adjusters 98, 100, 124 and 126. The girth straps 34 are used to keep the angle of the neck collar 30 and tie strap 32 at an approximate 50-70° angle to allow the harness 10 to move freely with the dog's body and to keep the cross-strap 60 in position on the scruff 25 of the dog 12.

The harness 10 may be made of any of a variety of materials, preferably strong and flexible webbing, such as canvas or polypropylene webbing. It is within the scope of the present invention to provide a variety of sizes and widths to the webbing, generally and preferably depending on the size of the dog. For example, a small or toy dog will receive webbing much smaller, i.e., approximately one-half to one inch wide, while a larger dog can receive webbing up to two to three inches wide.

The harness straps are preferably made of thin, soft material that will not rub or chafe the animal's skin or fur. A preferred material is polypropylene having a 900 pound stress for the two inch version and a 500 pound stress for the one inch version.

The harness' strapping systems are preferably one and two inches wide which provides maximum comfort and creates a gentle and consistent pressure to ensure the therapeutic calming effect. The width of the straps gives a smooth comforting fit and doesn't pinch or cut into the skin like narrow banded harnesses.

The adjusting features incorporated into the strapping system include up to three D-rings, seven double D-rings and two quick release buckles all preferably made of military grade polypropylene. Preferably, the harness 10 includes two adjusters, 48, 50 for the neck collar 30, at least one adjuster 74 for the tie strap 32, at least two adjusters 98, 100, one each for the upper girth straps 82, 84, and at least two adjusters 124, 126, one each for the lower girth straps 110, 112. The combination of adjusters ensure a custom fit for all body types, i.e., thick chested, thin boned, barrel bodied to slim and sleek.

A typical adjuster is a narrow rectangular connector having a center bar. In use, one strap is firmly affixed to the center, and the connecting strap will pass through one side of the connector over the center bar and through the other side of the adjuster. In this manner, the connecting strap may be loosened and adjusted, i.e., tightened or loosened, over the center bar. Once adjusted, the connecting strap lays over the fixed strap in a non-slip fashion.

Releasable connectors, also known as "quick release buckles," are known to the art and may be made of metal, plastic or other materials. For purposes of the present invention, the term "buckle" or "quick-release buckle" will be used. However, it is within the scope of the present invention to use or substitute a variety of connectors. Non-limiting examples of other types of connectors include snaps, belt buckles, hooks, and hook and loop, i.e., VELCRO type connectors.

As illustrated in FIGS. 1 and 3-5, the harness 10 can be placed on the dog 12 by placing the neck collar 30 over the head 14 and neck 17 of the dog 12 such that first end 42 of the neck collar 30 rests near the dog's sternum 24 and the second end 46 of the neck collar 30 is placed behind the dog's head 14 such that the cross-strap 60 is positioned over the scruff 25 behind the dog's neck 17. The harness 10 is secured to the dog 12 by connecting the two quick release buckles 90, 92 thereby joining together the first upper girth straps 82, 84 with the second lower girth straps 110, 112. With the cross-strap 60 location placed at the scruff 25 behind the dog's neck 17, it is preferable to have a certain looseness of the harness 10 on the dog 12 such that a handler can place at least one and preferably two hands between the girth straps 34 and the neck collar 30. In this manner, the harness 10 is placed on the dog 12 in a preferred manner.

The harness 10 can be custom fit to every dog 12 using some or all of the adjusting features on the harness 10 as described previously. Because the harness 10 adjusts all the body's critical angles, it ensures that there is no puckering and that straps and materials lie flat and smooth. The positioning of the straps on the harness 10 promotes forward momentum and offers the dog 12 increased stability which guarantees the dog's complete range of motion to run, jump and play. Likewise, the dog 12 can easily stretch out to sleep and even lie on his back without any binding.

The harness 10 can be quickly removed by reversing the procedure and unsnapping the quick release buckles 90, 92 and slipping the harness 10 off and over the dog's head 14. The harness 10 can be removed while the dog 12 is lying down since the girth straps 34 easily slide out from under a sleeping dog.

Because the harness 10 applies only gentle pressure and is not binding, it cannot constrict breathing. The harness 10 is loose enough such that the handler can slide his/her hand between the dog's body and the strap, i.e., the harness 10 has a truly "gentle, loose fit," but still provides maximum calming. The harness 10 places only slight pressure on the scruff 25 behind the dog's neck 17. The harness 10 applies gentle pressure only where the straps rest on the dog's body 20.

Without wishing to be restricted to any one explanation, it is believed that the harness 10 performs its calming and behavioral modifications in similar fashion as the same light touch that occurs in nature when a mother dog "scruffs" her pup. During scruffing, oxytocin is released by the pup. Oxytocin is a naturally occurring neurotransmitter that regulates the arousal effect of the nervous system. Oxytocin lessens fear and produces calm on a cortical (conscious) and a non-cortical (unconscious) level. Oxytocin is a potent catalyst of the psycho-physiological stress reliever of the fight or flight syndrome. Because of its neurochemical basis the release of oxytocin gives an instant sense of safety and trust that override the fight-flight and fright that is caused by relational situations.

Figure 6:
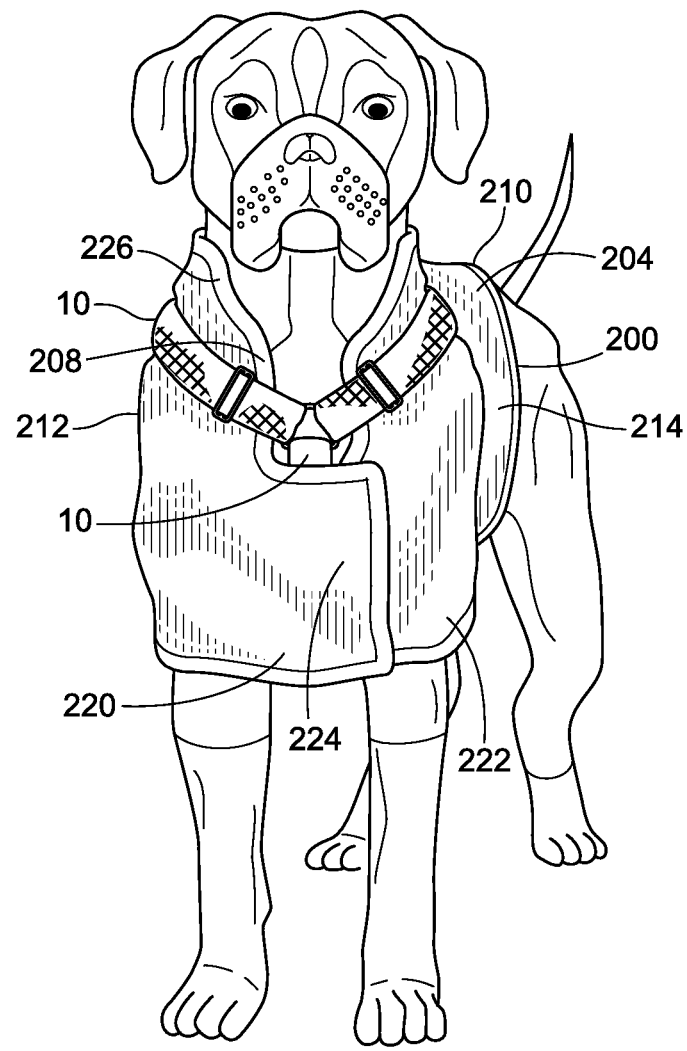
FIG. 6 is a side perspective view illustrating the harness in combination with a coat.
Figure 7:
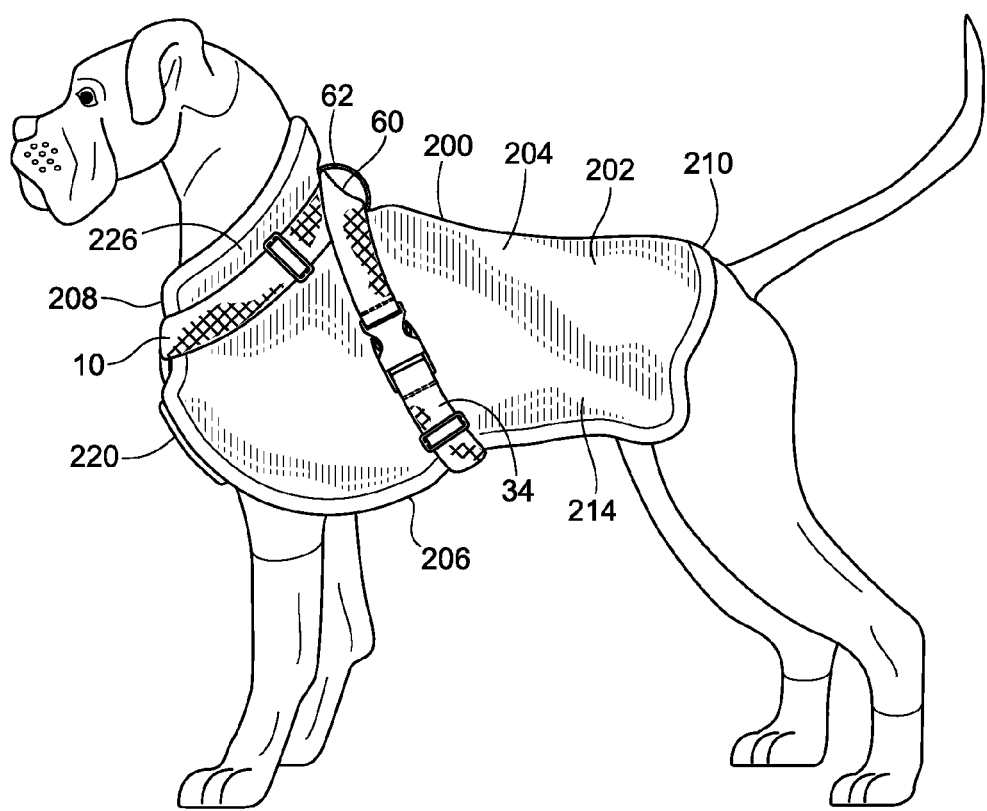
FIG. 7 is a perspective view illustrating a dog wearing the harness-coat combination.

Accompanying the harness 10 can be a coat 200 where the coat 200 and harness 10 can be made together and to securely hold and control an animal 12. As illustrated in FIGS. 6 and 7, the coat 200 includes a cover 202 having a first top side 204 and a second bottom side 206 next to the animal when the coat 200 is worn. The cover 202 includes a front neck portion 208, a rear portion 210 and two side portions 212, 214. The cover 200 can have a number of shapes from square to rectangular to round depending on the size, conformation and relative needs of the animal. As illustrated in FIG. 7, the rear portion 210 is rounded or scalloped to conform to the dog's hind quarters.

The front neck portion 208 is defined by a releasably locking neck piece 220 comprising a first right piece 222 and a second overlapping right piece 224. The first and second neck pieces 222, 224 can be releasably fixed by a number of closure devices known to the art. Non-limiting examples include buttons, snaps, zippers, hooks, and hook and loop, i.e., VEL- CRO fasteners. Without wishing to limited to one particular form of closure device, neck pieces illustrated in the figures include hook and loop fasteners. The front neck portion 220 can also include a collar 226, which can be permanently or releasably affixed to the front neck portion 222, as illustrated in FIGS. 6 and 7.

The harness 10 is the same or similar to that described with respect to FIGS. 1-5. As illustrated in FIGS. 6 and 7, the harness 10 can be releasably or permanently affixed to the coat 200. It is also within the scope of the present invention to provide a separate coat 200 and harness 10 wherein the coat 200 may be placed on the animal first, followed by placement of the harness 10. Alternatively, the harness 10 may be releasably attached to the coat 200 by fastener means as described above. A further alternative includes a permanently affixed harness 10 wherein the harness 10 is sewn, glued, stapled or otherwise permanently attached to the coat 200.

The coat 200 itself, to which the straps of the harness 10 are attached, adds comfort to the harness 10 and help maintain the placement of the cross-strap 60 in the proper position, but is not used as a pressure apparatus. Therefore, the therapeutic harness 10 is less of an intrusion of external forces and works by touching the dog 12 on the scruff 25 as described above.

A leash (not illustrated) can be attached to the attachment mechanism 62 affixed to the harness 10 at the cross-strap 60 location on the coat 200 eliminating the need for a separate dog collar and combining both the coat 200 and harness 10 into one unit.

The one and two inch adjustable strapping systems not only provide the structure and tailored fit of the coat and induce the calming effect on the dog, but they comprise the comfort-fit harness 10 for the dog 12.

The bottom side 206 of the coat 200 is preferably constructed of a non-slip surface to prevent the coat 200 from sliding sideways or slipping on the animal's back 20. The non-slip surface does not damage the pet's hair and is modeled after pads that prevent saddles from sliding in equestrian competitions.

The harness coats come in a variety of weights, styles, fabrics and colors. Without being limited to a type of fabric, the coat material can comprise the following textile materials: cotton, linen, silk, twill, upholstery, leather, wool, elastic, woven materials, synthetic and elastic materials, and combinations of the same. The material can also be treated by means known to the art for ultraviolet protection, fly, flea, tick, and mosquito repellency.

It is also within the scope of the present invention to provide a combination harness/coat with the following qualities and capabilities:

Flea Coat: a harnessed calming coat of mid-weight to lightweight fabric. This fabric is treated with chemicals that deter fleas, ticks, flying insects, mosquitoes and biting flies. This harness is used by hunters in the Rip-Stop fabric in the deep woods and by the average person walking their pets in unsprayed, uncontrolled areas such as parks or on trails.

Sport Coat: a harnessed calming coat with reflective straps, trim and leash to ensure high visibility in dimly lit areas and at night. This coat is ideal for the dog-jogger and night-walker.

Rain Coat: a harnessed calming coat made of water resistant or waterproof fabric. This coat is used mostly in stormy weather to keep the pet dry but is frequently used as a wind breaker.

Snow Coat: a harnessed calming coat that is made of a heavy weight quilted fabric. This coat is designed to keep pets warm in the colder months.

Sun Coat: a harnessed calming coat of light weight, breathable material. This coat is treated to prevent ultraviolet damage to the pet's hair and skin With an appropriate SPF, the coat prevents sunburn and protects against dry and brittle hair for over 90% of the pet's body. The coat works especially well for pets with sensitive skin. The coat reflects the heat away from your pet's body to help keep your pet cooler in the heat of the summer.

Any version of any component or method step of the invention may be used with any other component or method step of the invention. The elements described herein can be used in any combination whether explicitly described or not.

All combinations of method steps as used herein can be performed in any order, unless otherwise specified or clearly implied to the contrary by the context in which the referenced combination is made.

As used herein, the singular forms "a," "an," and "the" include plural referents unless the content clearly dictates otherwise.

Numerical ranges as used herein are intended to include every number and subset of numbers contained within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 5 to 6, from 1 to 9, from 3.6 to 4.6, from 3.5 to 9.9, and so forth.

All patents, patent publications, and peer-reviewed publications (i.e., "references") cited herein are expressly incorporated by reference in their entirety to the same extent as if each individual reference were specifically and individually indicated as being incorporated by reference. In case of conflict between the present disclosure and the incorporated references, the present disclosure controls.

The devices, methods, compounds and compositions of the present invention can comprise, consist of, or consist essentially of the essential elements and limitations described herein, as well as any additional or optional steps, ingredients, components, or limitations described herein or otherwise useful in the art.

While this invention may be embodied in many forms, what is described in detail herein is a specific preferred embodiment of the invention. The present disclosure is an exemplification of the principles of the invention is not intended to limit the invention to the particular embodiments illustrated. It is to be understood that this invention is not limited to the particular examples, process steps, and materials disclosed herein as such process steps and materials may vary somewhat. It is also understood that the terminology used herein is used for the purpose of describing particular embodiments only and is not intended to be limiting since the scope of the present invention will be limited to only the appended claims and equivalents thereof.

What is claimed is:

1. An animal calming harness for an animal, comprising:
   a. a neck collar having a first end and a second end;
   b. a tie strap having a first end and a second end, wherein the first end of the tie strap is connected to the first end of the neck collar, wherein the tie strap is adapted to pass along the chest of the animal;
   c. a girth strap having a first end and a second end, wherein the second end of the girth strap is connected to the second end of the neck collar forming a cross-strap location on scruff of the animal, and the second end of the girth strap is connected to the first end of the tie strap, wherein the girth strap is positioned such that the cross-strap location is located between the neck and shoulder blades of the animal in a manner to apply gentle pressure on the animal.

2. The animal calming harness of claim 1 wherein the cross-strap location includes a leash connector.

3. The animal calming harness of claim 1 wherein the tie strap includes a length adjuster.

4. The animal calming harness of claim 1 wherein the neck collar includes at least one length adjuster.

5. The animal calming harness of claim 1 wherein the girth strap includes at least one length adjuster.

6. The animal calming harness of claim 1 wherein the girth strap includes a first body strap and a second body strap.

7. The animal calming harness of claim 6 wherein the first and second body straps include release mechanisms.

8. The animal calming harness of claim 1 wherein the neck collar is positioned at an approximate thirty degree angle to the girth strap.

9. An animal calming harness for an animal, comprising:
 a. a neck collar having a first end and a second end;
 b. a tie strap having a first end and a second end, wherein the first end of the tie strap is connected to the first end of the neck collar, wherein the tie strap is adapted to pass along the chest of the animal;
 c. a girth strap having a first end and a second end, wherein the second end of the girth strap is connected to the second end of the neck collar forming a cross-strap location on scruff of the animal, and the second end of the girth strap is connected to the first end of the tie strap, wherein the neck collar is positioned at an angle between approximately fifty and seventy degrees to the tie strap.

10. A combination therapeutic calming harness and coat combination for an animal comprising:
 a. a harness, comprising:
  i. a neck collar having a first end and a second end;
  ii. a tie strap having a first end and a second end, wherein the first end of the tie strap is connected to the first end of the neck collar, wherein the tie strap is adapted to pass along the chest of the animal;
  iii. a girth strap having a first end and a second end, wherein the second end of the girth strap is connected to the second end of the neck collar forming a cross-strap location on scruff of the animal, and the first end of the girth strap is connected to the first end of the tie strap, wherein the girth strap is positioned such that the cross-strap location is located between the neck and shoulder blades of the animal in a manner to apply gentle pressure on the animal; and
 b. a coat in combination with the harness, comprising
  i. a first neck portion, wherein the neck portion includes a releasably locking neck piece;
  ii. a second rear portion; and
  iii. alternating side portions, wherein the collar is releasably secured to the coat.

11. The harness and coat combination of claim 10 wherein the releasably locking neck piece includes a first left piece and a second right piece comprising means to releasably close the first left piece and the second right piece.

12. The harness and coat combination of claim 10 wherein the coat further includes a collar.

13. The harness and coat combination of claim 10 wherein the harness is removably affixed to the coat.

14. The harness and coat combination of claim 10 wherein the harness is permanently affixed to the coat.

15. The harness and coat combination of claim 10 wherein the cross-strap location includes a leash connector.

16. The harness and coat combination of claim 10 wherein the tie strap includes a length adjuster.

17. The harness and coat combination of claim 10 wherein the neck collar includes at least one length adjuster.

18. The harness and coat combination of claim 10 wherein the girth strap includes at least one length adjuster.

19. The harness and coat combination of claim 10 wherein the girth strap includes a first body strap and a second body strap.

20. The harness and coat combination of claim 10 wherein the first and second body straps include release mechanisms.

* * * * *